UNITED STATES PATENT OFFICE.

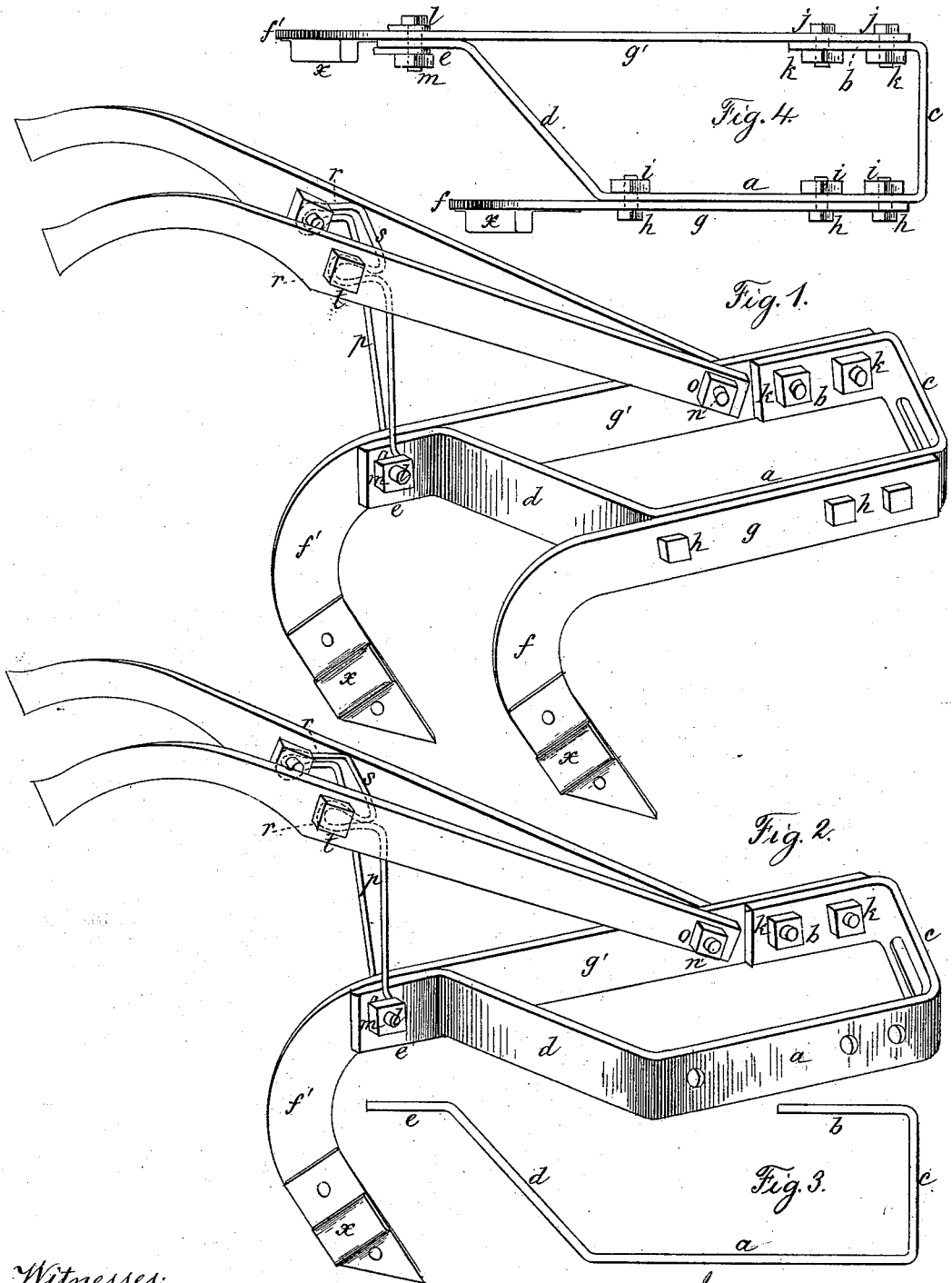

MITCHELL HANCOCK, OF HOPEWELL, GEORGIA.

CULTIVATOR-PLOW.

SPECIFICATION forming part of Letters Patent No. 268,223, dated November 28, 1882.

Application filed August 23, 1882. (No model.)

*To all whom it may concern:*

Be it known that I, MITCHELL HANCOCK, a citizen of the United States, residing at Hopewell, in the county of Colquitt and State of Georgia, have invented new and useful Improvements in Cultivator-Plows, of which the following is a specification.

A metal plate bent in a peculiar manner forms a brace and a frame for the attachment of separate long and short plow-beams, the long one of which supports the handles, while the short one is detachable to make a single or double cultivator-plow, as may be desired to suit the work; and my improvement consists of the peculiar bent frame-brace, formed as hereinafter described, in combination with a long and a short plow-beam secured to the opposite sides of the bent frame-brace in such manner as to form a straddle-cultivator or a single-plow cultivator.

In the drawings, Figure 1 is a perspective view of a straddle-beam cultivator constructed in accordance with my invention. Fig. 2 is a similar view of a single-beam cultivator. Fig. 3 is a view of the frame-brace, to which the clevis and the plow-beams are secured; and Fig. 4 is a top view, showing both plow-beams secured to the frame-brace.

A bent plate forms the frame-brace, having a long right-hand part, $a$, a short left-hand part, $b$, a front cross part, $c$, and a rear diagonal part, $d$, terminating in a bend, $e$, parallel and in line with the front short left-hand bent part, $b$.

The curved plow-standards $f\ f'$ are formed with horizontal arms $g\ g'$, of flat plates of unequal length. The shortest one, $g$, of the standard $f$ is adapted to be secured to the outer side of the main or long side $a$ of the bent frame-brace by bolts $h$ and nuts $i$, and is of a length corresponding to said portion $a$, while the longest arm, $g'$, of the standard $f'$ is secured at its forward end to the rearwardly-bent portion $b$ of the frame-brace by bolts $j$ and nuts $k$, and at its rear end to the rear parallel portion, $e$, of the diagonal brace part $d$ by a bolt, $l$, and nut $m$.

The plow-handles are secured to the forward end of the long plow-beam by a bolt, $n$, and nut $o$. The handles are braced by a brace, $p$, diverging from the long plow-beam, and secured thereto by the bolt $l$, which also secures the said long plow-beam to the diagonal brace part $d$. The handle-brace $p$ is bent to form loops $r\ r$, and a cross-brace, $s$, said loops being secured upon bolts $t\ t$ by nuts. The cross part $c$ of the frame-brace is slotted to receive a clevis.

By the construction thus described the short plow-beam may be removed and a single plow used. The parts are all firmly braced and secured together, and the simplicity of their form and relative arrangement render the improvement well suited for a cheap and durable single or double cultivator-plow.

The standards are each provided with any desired clamping device or socket $x$ to receive a mold-board or shovel.

I claim—

In a cultivator-plow, the combination, with a frame-brace consisting of the main portion $a$, cross part $c$, rearwardly-projecting arm $b$, diagonal brace part $d$, of a curved plow-standard, $f$, provided with a horizontal arm, $g$, adapted to be removably secured to the main portion $a$ of the frame-brace, and a second curved standard, $f'$, whose arm $g'$ is adapted to be secured to the opposite side, $b$, of the frame and the handles, substantially as described.

In testimony whereof I have hereunto set my hand in the presence of two subscribing witnesses.

M. HANCOCK.

Witnesses:
C. H. YOUNG,
W. H. BRANDON.